United States Patent
Hofmann et al.

[11] Patent Number: 5,855,325
[45] Date of Patent: Jan. 5, 1999

[54] METHOD OF SEPARATING GLASS FROM FILM IN THE RECYCLING OF LAMINATED GLASS PANES

[75] Inventors: Jürgen Hofmann, Salzwedel; Hans-Otto Demski, Aumühle, both of Germany

[73] Assignee: TZN Forschungs-und, Unterlüss, Germany

[21] Appl. No.: 810,016

[22] Filed: Mar. 3, 1997

[30] Foreign Application Priority Data

Mar. 2, 1996 [DE] Germany ................ 196 08 045.2

[51] Int. Cl.⁶ .................................................. B02C 19/12
[52] U.S. Cl. .......................... 241/1; 241/14; 241/17; 241/20; 241/24.22
[58] Field of Search ............................. 241/5, 14, 17, 241/20, 24.22

[56] References Cited

U.S. PATENT DOCUMENTS

| | | | |
|---|---|---|---|
| 4,070,273 | 1/1978 | Morey | 209/3 |
| 4,583,695 | 4/1986 | Genestie | 241/24 |
| 4,795,103 | 1/1989 | Lech | 241/77 |
| 5,333,797 | 8/1994 | Becker et al. | 241/19 |
| 5,350,121 | 9/1994 | Vitunac et al. | 241/14 |
| 5,513,807 | 5/1996 | Stricker | 241/23 |
| 5,647,544 | 7/1997 | Greiner et al. | 241/17 |

*Primary Examiner*—John M. Husar
*Attorney, Agent, or Firm*—Venable; Gabor J. Kelemen

[57] ABSTRACT

A method of separating glass from film in a recycling of laminated panes, includes the following consecutive steps: in a crusher, breaking the glass carried on the film; heating the broken panes in a heating bath; and removing the glass from the film in a separating device.

11 Claims, 1 Drawing Sheet

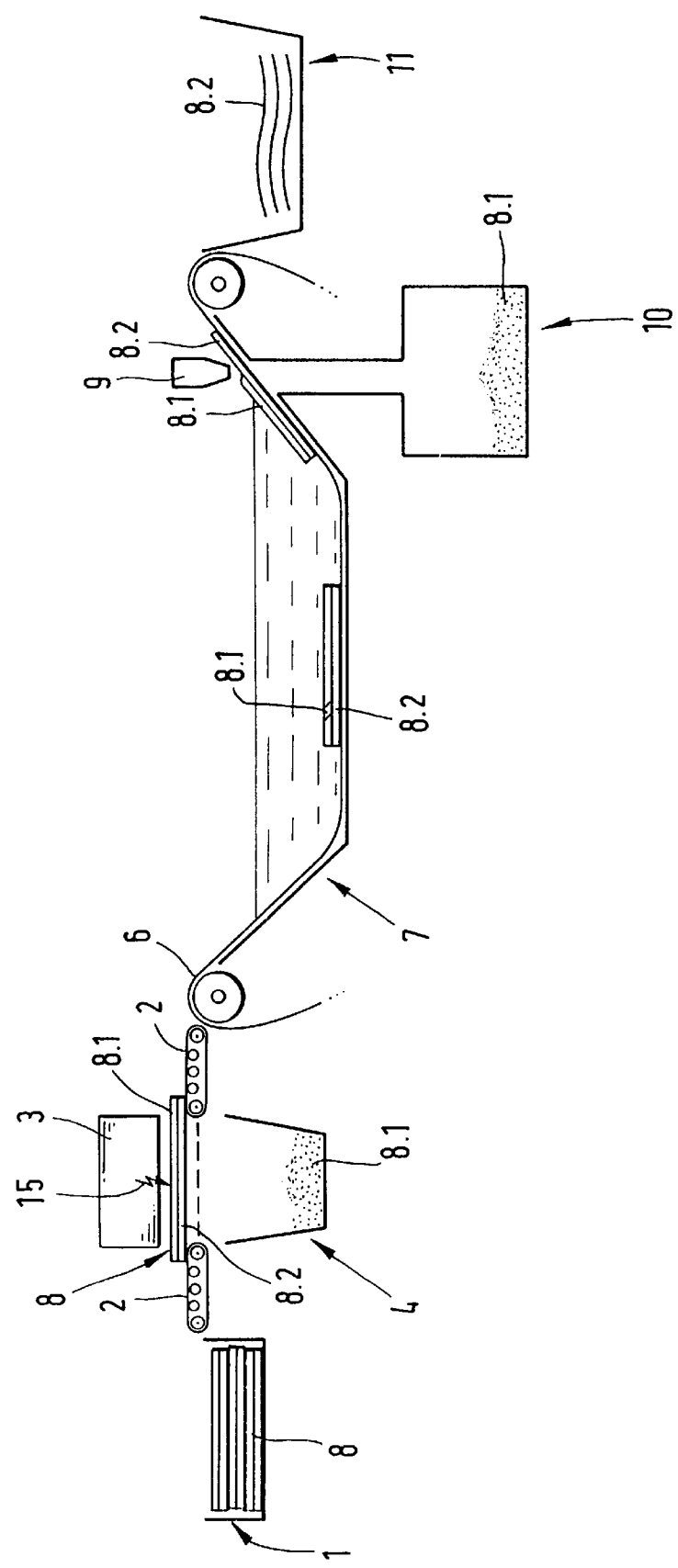

METHOD OF SEPARATING GLASS FROM FILM IN THE RECYCLING OF LAMINATED GLASS PANES

CROSS REFERENCE TO RELATED APPLICATION

This application claims the priority of German Application No. 196 08 045.2 filed Mar. 2, 1996, which is incorporated herein by reference.

BACKGROUND OF THE INVENTION

This invention relates to a method of separating glass from film, particularly in the waste treatment (recycling) of laminated glass panes.

Methods of separating glass from film by means of drum crushers, toothed cylinder crushers or hammer mills are known. With such methods a separation of the glass from the film is achieved only to an extent of approximately 80%. The residual glass-and-film composite is subsequently burned. The drawbacks of these methods further include crusher wear and the fact that the film itself is comminuted. It is also a disadvantage that glass dust is generated which prevents an environmentally friendly recycling.

SUMMARY OF THE INVENTION

It is an object of the invention to provide an environment-friendly recycling method for separating laminated glass into glass and film components. This object and others to become apparent as the specification progresses, are accomplished by the invention, according to which, briefly stated, the method of separating glass from film in a recycling of laminated panes, includes the following consecutive steps: in a crusher, breaking the glass carried on the film; heating the broken panes in a heating bath; and removing the glass from the film in a separating device.

By introducing the pre-crushed laminated glass panes into a heating bath, a 99% separation of glass from the foil can be achieved. The film is not comminuted so that it may be reintroduced into cycling of the material and thus need not be burned. The glass, on the other hand, may be melted in its entirety.

BRIEF DESCRIPTION OF THE DRAWING

The sole Figure is a schematic side elevational view illustrating a preferred embodiment of the method according to the invention.

DESCRIPTION OF THE PREFERRED EMBODIMENT

Turning to the Figure, a supply station (such as a supply container) 1 contains laminated glass 8 formed of a glass layer 8.1 and a film 8.2 which may be, for example, a polyvinyl chloride film. Downstream of the supply station 1, as viewed in a direction of material supply, a conveyor 2 is located which introduces the composite material into and transports it away from a pre-crushing or comminuting device 3. The conveyor 2 has preferably a sieve-like construction to allow glass fragments 8.1 to fall into a collecting receptacle 4 positioned underneath the comminuting device 3. At the lateral edges of the conveyor 2 conventional gripping systems may be arranged for stopping the laminated panes. A further conveyor 6 which may be similar to the conveyor 2, is arranged immediately downstream of the conveyor 2 and passes through a heating bath 7, preferably a heating water bath. Along the lateral edges of the conveyor 6 non-illustrated gripping systems are provided for arresting the film 8.2 carrying the preliminarily crushed glass layer 8.1. Such gripping systems may comprise suction devices or gripping strips similar to those used in paper sheet positioning. A separating device 9 is provided preferably at the downstream end of the heating bath 7. It is also feasible to provide the separating device 9 externally of the heating bath 7; in such a case, however, heat losses of the heated laminated glass 8 occur, so that the separation of the glass 8.1 requires a higher energy input by the separating device 9. Downstream of the heating bath 7, preferably underneath the separating device 9 in the region of the heating bath 7, a collecting receptacle 10 is provided. A further collecting receptacle 11 is positioned at the downstream end of the conveyor 6.

In the description which follows, the method according to the invention will be set forth.

The laminated glass panes 8 are transferred from the supply container 1 to the conveyor 2 of the comminuting device 3 which performs a preliminary crushing of the glass 8.1, for example, with the aid of a non-illustrated encapsulated energy converter which generates a high energy pulse 15 and applies it directly to the laminated glass panes 8 via a diaphragm. For generating the high energy pulses 15, a non-illustrated energy supply device including a condenser battery and a d.c. pulse current source is utilized in a conventional manner. For the preliminary crushing to glass fragments of, for example, less than 50 mm$^2$, various parameters of the high energy pulse 15 are necessary dependent on the composition of the laminated glass panes. For example, related to a pane 8 of 1 m$^2$, it is advantageous to utilize an energy of 2–8 KJ per pulse as well as a pulse frequency between 10 and 40 pulses. It is to be understood, however, that other conventional glass comminuting methods may be used, for example, a cylinder assembly with specially shaped cylinders.

The preliminarily crushed laminated glass pane 8 is introduced by the conveyor 6 into the heating bath 7 which has a temperature of preferably 40°–70° C. The pane 8 is caused to dwell in the heating bath for a period of, for example, 10–30 minutes. As a result of this heat treatment the adhering force between the glass fragments 8.1 and the film 8.2 is reduced.

A high-pressure water jet which may have a pressure of, for example, up to 6 bar, is generated in the separating device 9 and is caused to impinge on the pane 8. This treatment results in a separation of the residual glass 8.1 from the film 8.2. The separation, however, may be performed by a scraper or a scraper-like device instead of a high-pressure water jet or the two processes may be used in combination.

By means of the conveyor 6 the film 8.2 is moved to the collecting receptacle 11, while the separated glass 8.1 drops into the collecting receptacle 10. In this process, one part of the water of the water bath 7 or the high pressure water jet may gain access to the receptacles 10 and/or 11. Such water is removed in a non-illustrated manner by suction or filtering. For cleaning the heating bath 7 additionally a non-illustrated conveyor belt may be introduced into the heating bath 7. Such belt receives the glass fragments 8.1 already deposited in the heating bath 7 and removes them therefrom.

The above-described process may also perform a glass/film separation in case of glass panes 8 which are formed of two glass layers between which a film is sandwiched. By appropriate arrangements of the separating device 9 above and underneath the conveyor 6, particularly one which is associated with the earlier-noted gripping or grasping systems, a separation of both glass layers from the film is achieved. In such a process too, the film remains intact and may be reused.

It will be understood that the above description of the present invention is susceptible to various modifications, changes and adaptations, and the same are intended to be comprehended within the meaning and range of equivalents of the appended claims.

What is claimed is:

1. A method of separating glass from film in a recycling of laminated panes, comprising the following consecutive steps:

(a) in a crusher, breaking the glass carried on the film while leaving the film uncomminuted;

(b) heating the broken panes in a heating bath for weakening a bond between the glass and the film; and (c) removing the glass from the film in a separating device.

2. The method as defined in claim 1, wherein step (a) comprises the step of applying high-energy pulses to the panes.

3. The method as defined in claim 2, wherein said high-energy pulses have an energy of 2–8 KJ per pulse.

4. The method as defined in claim 3, wherein said high-energy pulses have a frequency of 10–40 pulses.

5. The method as defined in claim 1, further comprising the step of maintaining said heating bath at a temperature of 40°–70° C.

6. The method as defined in claim 1, wherein step (c) comprises the step of applying a high-pressure water jet to the panes.

7. The method as defined in claim 1, wherein step (c) comprises the step of scraping the glass off the film.

8. The method as defined in claim 1, further comprising the steps of conveying the panes into and out of the crusher by a conveyor and screening the panes on the conveyor to cause glass fragments to fall through the conveyor.

9. The method as defined in claim 1, further comprising the steps of conveying the panes into and out of the crusher by a conveyor and stopping the panes in the crusher by arresting devices along the conveyor.

10. The method as defined in claim 1, further comprising the steps of conveying the panes into and out of the heating bath by a conveyor and screening the panes on the conveyor to cause glass fragments to fall through the conveyor.

11. The method as defined in claim 1, further comprising the steps of conveying the panes into and out of the heating bath by a conveyor and stopping the panes in the heating bath by arresting devices along the conveyor.

* * * * *

UNITED STATES PATENT AND TRADEMARK OFFICE
CERTIFICATE OF CORRECTION

PATENT NO. : 5,855,325
DATED : January 5, 1999
INVENTOR(S) : Jürgen Hofmann et al It is certified that error appears in the above-indentified patent and that said Letters Patent is hereby corrected as shown below:

On the title page, item [73], the name of the assignee should read --TZN Forschungs-und Entwicklungszentrum--.

Signed and Sealed this

Sixth Day of July, 1999

*Attest:*

Q. TODD DICKINSON

*Attesting Officer*   Acting Commissioner of Patents and Trademarks